June 19, 1928.  
J. C. FRANK  
1,674,358  
RADIATOR SUPPORT  
Filed May 21, 1927
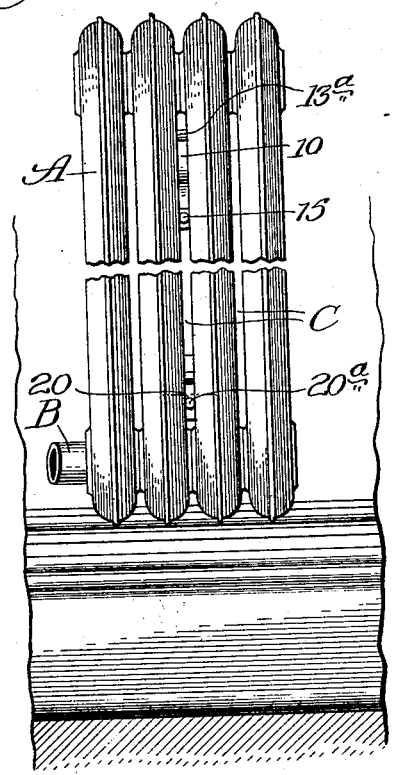
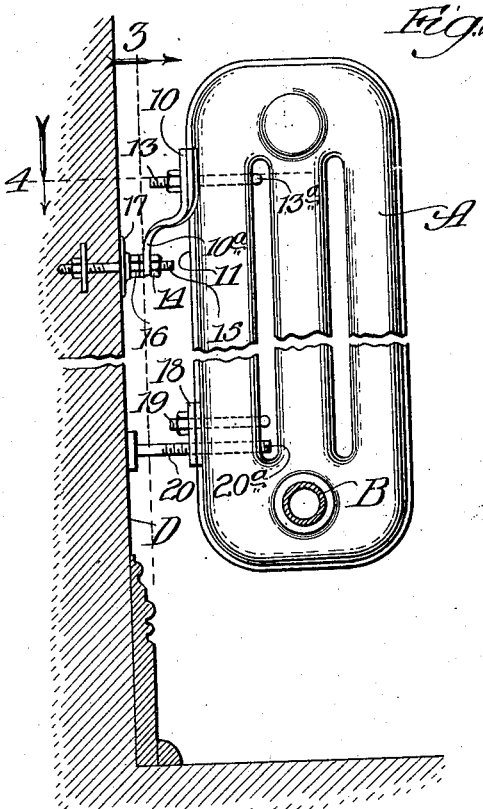
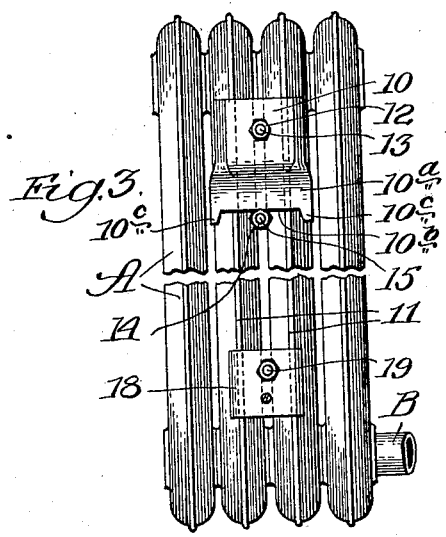
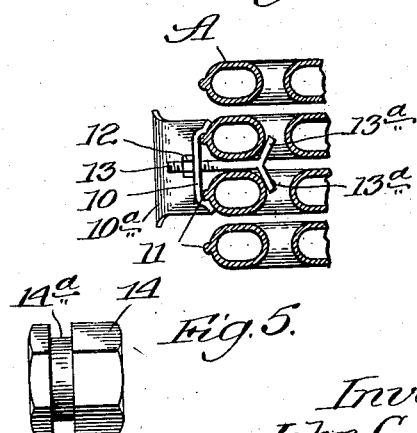
Inventor:  
John C. Frank,  
By Dyrenforth, Lee, Chritton & Niles,  
Attys.

Patented June 19, 1928.

1,674,358

UNITED STATES PATENT OFFICE.

JOHN C. FRANK, OF CHICAGO, ILLINOIS.

RADIATOR SUPPORT.

Application filed May 21, 1927. Serial No. 193,148.

This invention relates to a support for radiators, and the like, and is particularly adapted for supporting radiators on the vertical walls of buildings. The invention is fully described in the following specification and shown in the accompanying drawings, in which—

Figure 1 is a front elevation of a radiator support by a bracket embodying the invention;

Fig. 2 is an end elevation of the same showing the wall partly in section;

Fig. 3 is a rear view on the line 3 of Fig. 2;

Fig. 4 is a partial horizontal section on the line 4 of Fig. 2; and

Fig. 5 is a side elevation of a grooved nut for carrying the bracket.

The embodiment illustrated comprises a radiator A of a form commonly used in steam and hot-water heating systems which is made up of a number of similar hollow sections secured together at the top and bottom so that steam from a pipe B may pass freely from one section to the other. These sections are separated at their centers by spaces C.

My invention includes a bracket 10 which, as shown in Fig. 4, is adapted to fit over the sharpened, or beaded, edges 11 of two adjacent sections of the radiator. This bracket is held in place by means of a nut 12 on the bolt 13 which passes through an opening in the bracket 10 while the head of the bolt 13ª is made Y-shaped, or T-shaped, so that it can be passed through an opening C and then turned 90°, as shown in Fig. 4, after which the nut 12 is screwed down so as to prevent the bolt from being turned, or removed.

The bracket 10 is provided with an offset lower portion 10ª, as shown in Fig. 2, which terminates at its lower portion in a substantially straight edge 10ᵇ with ears 10ᶜ at the sides.

The edge 10ᵇ is adapted to rest in an annular groove 14ª in a nut 14 which is threaded so as to be screwed upon a bolt 15 which is secured in a wall D, as shown in Fig. 2. The bolt 15 is preferably rigidly secured against the wall by means of a nut 16 which is drawn down against a washer 17 after which the nut 14 is screwed down against the nut 16.

The straight edge 10ᵇ of the bracket 10 resting as it does within the groove 14ª of the nut 14 provides a ready means of edgewise adjustment of the bracket 10 so that any come and go of the radiator, due to expansion and retraction, is provided for. In this connection, it will be observed that only one end of the radiator is shown and only one bracket for supporting the same. A similar supporting means is provided for the opposite end of the radiator.

In order to hold the lower end of the radiator away from the wall, I have provided a plate 18 which is secured to the back of the radiator by means of a bolt 19 which is similar to the bolt 13 previously described. This plate is threaded and provided with a screw 20 which passes therethrough, the screw having at its inner end a screw-driver slot 20ª which, as shown in Fig. 1, is accessible to a screw-driver inserted through one of the openings C. This screw has a head 21 which bears upon the wall D.

Thus, it will be seen that the screw 20 may be turned after the radiator is roughly set in place so as to bring the radiator into the desired vertical position wherein the screws 20 at the two ends of the radiator will bear substantially equally upon the wall.

While the edge 10ᵇ of the bracket 10 may readily rest upon the bolt 15, the screws 14 and 16 being sufficiently separated for this purpose, the use of a nut 14 having an annular groove 14ª is thought to be much more desirable. This groove also makes it possible to turn the nut 14 so as to adjust the radiator toward and from the wall, when necessary.

While I have shown and described but a single embodiment of my invention, it is to be understood that it is capable of many modifications. Changes, therefore, in the construction and arrangement may be made which do not depart from the spirit and scope of the invention as disclosed in the appended claims.

What I regard as new, and desire to secure by Letters Patent, is:

1. A support for radiators comprising a bracket adapted to be rigidly bolted to said radiator, near its top, said bracket having an outwardly and downwardly inclined portion terminating in an edge having ears at its ends, a bolt adapted to be secured in a wall, and a nut on said bolt having an annular groove for receiving said edge of the bracket.

2. A support for radiators comprising a bracket adapted to be rigidly bolted to said radiator, near its top, said bracket having an outwardly and downwardly inclined portion terminating in an edge having ears at its ends, a bolt adapted to be secured in a wall, a nut on said bolt for retaining said bracket on said bolt, and a horizontally adjustable means on the bottom of said radiator for holding the radiator a predetermined distance from said wall.

In witness whereof, I have hereunto set my hand this 17th day of May, 1927.

JOHN C. FRANK.